US010313715B2

(12) United States Patent
Peng et al.

(10) Patent No.: US 10,313,715 B2
(45) Date of Patent: Jun. 4, 2019

(54) TRANSMISSION METHOD FOR VIDEO DATA AND DEVICE EMPLOYING SAME

(71) Applicant: NANNING FUGUI PRECISION INDUSTRIAL CO., LTD., Nanning (CN)

(72) Inventors: Po-Chuan Peng, Hsin-Chu (TW); Te-Wen Hsu, Hsin-Chu (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 75 days.

(21) Appl. No.: 15/498,481

(22) Filed: Apr. 27, 2017

(65) Prior Publication Data

US 2018/0316951 A1 Nov. 1, 2018

(51) Int. Cl.
*H04N 21/234* (2011.01)
*H04N 21/2665* (2011.01)
*H04N 21/258* (2011.01)
*H04N 21/24* (2011.01)
*H04N 19/94* (2014.01)

(52) U.S. Cl.
CPC ....... *H04N 21/23424* (2013.01); *H04N 19/94* (2014.11); *H04N 21/23418* (2013.01); *H04N 21/2402* (2013.01); *H04N 21/25866* (2013.01); *H04N 21/2665* (2013.01)

(58) Field of Classification Search
CPC ......... H04N 21/23424; H04N 21/2402; H04N 21/25866; H04N 21/2665; H04N 21/23418
See application file for complete search history.

(56) References Cited

U.S. PATENT DOCUMENTS

| | | | | |
|---|---|---|---|---|
| 2010/0265392 A1* | 10/2010 | Shao | ...................... | H04N 7/012 348/446 |
| 2012/0113455 A1* | 5/2012 | Ebitani | .............. | H04N 1/00013 358/1.14 |
| 2013/0114893 A1* | 5/2013 | Alakuijala | ........... | H04N 19/463 382/166 |
| 2017/0228895 A1* | 8/2017 | Lee | .................. | H04N 21/44008 |

FOREIGN PATENT DOCUMENTS

CN 105472294 A 4/2017

* cited by examiner

*Primary Examiner* — Tat C Chio
(74) *Attorney, Agent, or Firm* — ScienBiziP, P.C.

(57) ABSTRACT

A video data transmission method which is able to transmit compressed video data along with uncompressed video data determines whether any compressed data needs to be transmitted when transmitting uncompressed video data. When the compressed data needs to be transmitted, all pixels in each frame of the uncompressed video data are analyzed and one color which is dominant according to the number of pixels receiving it is obtained. The compressed data is inserted into the data for the relevant large number of pixels and the video data is transmitted to a receiving device after insertion of the compressed data.

12 Claims, 3 Drawing Sheets

TRANSMISSION METHOD FOR VIDEO DATA AND DEVICE EMPLOYING SAME

FIELD

The subject matter herein generally relates to communication technology.

BACKGROUND

A large amount of uncompressed video data needs to be transmitted between video source (e.g., video camera, DVD, mobile phone, or tablet PC) and video receiver (e.g., computer, television, display, or DVR). When transmitting the uncompressed video data, it is sometimes necessary to simultaneously transmit data which is compressed. At present, the uncompressed video data and the compressed data are transmitted separately, which increases power consumption and transmission costs.

BRIEF DESCRIPTION OF THE DRAWINGS

Implementations of the present technology will now be described, by way of example only, with reference to the accompanying figures, wherein.

DETAILED DESCRIPTION

Figure 1:
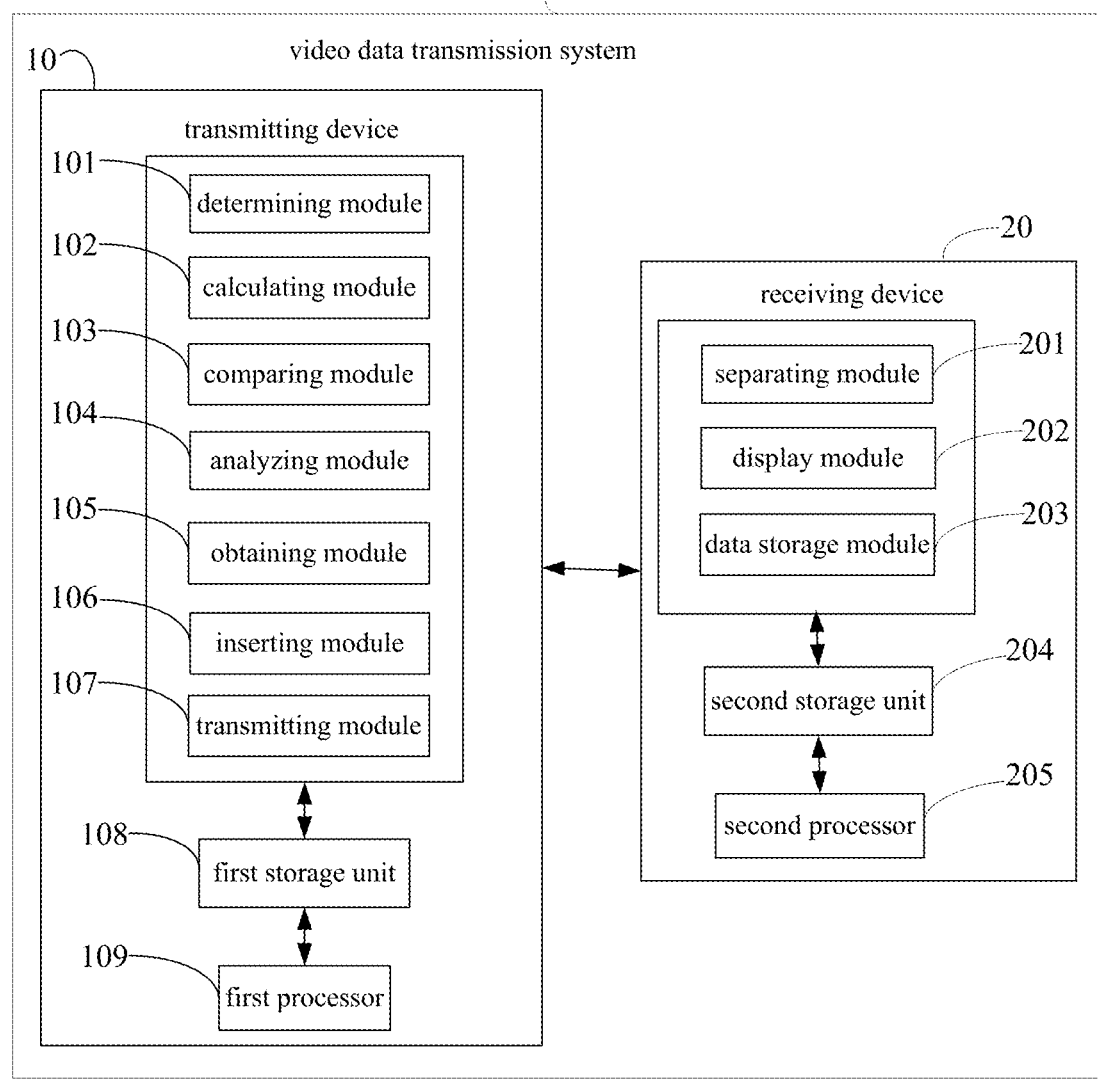
FIG. 1 is a block diagram of a video data transmission system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates an embodiment of a video data transmission system 2. In the illustrated embodiment, the video data transmission system 2 includes two video data transmission devices, a transmitting device 10 and a receiving device 20. The transmitting device 10 and the receiving device 20 transmit uncompressed video data and compressed data through a wired and a wireless network. The transmitting device 10 may be a mobile device, such as a mobile phone or a tablet computer. The receiving device 20 may be a computer, a television, and so on.

In one embodiment, the transmitting device 10 includes a determining module 101, a calculating module 102, a comparing module 103, an analyzing module 104, an obtaining module 105, an inserting module 106, a transmitting module 107, a first storage unit 108, and a first processor 109. The receiving device 20 includes a separating module 201, a display module 202, a data storage module 203, a second storage unit 204, and a second processor 205. One or more of the function modules can include computerized code in the form of one or more programs that are stored in the first storage unit 108 or the second storage unit 204, and executed by the first processor 109 or the second processor 205 to provide functions of the video data transmission system 2. The first storage unit 108 or the second storage unit 204 can be a dedicated memory, such as an EPROM, or a flash memory. Descriptions of the functions of the modules are given with reference to FIG. 2 and FIG. 3.

Figure 2:
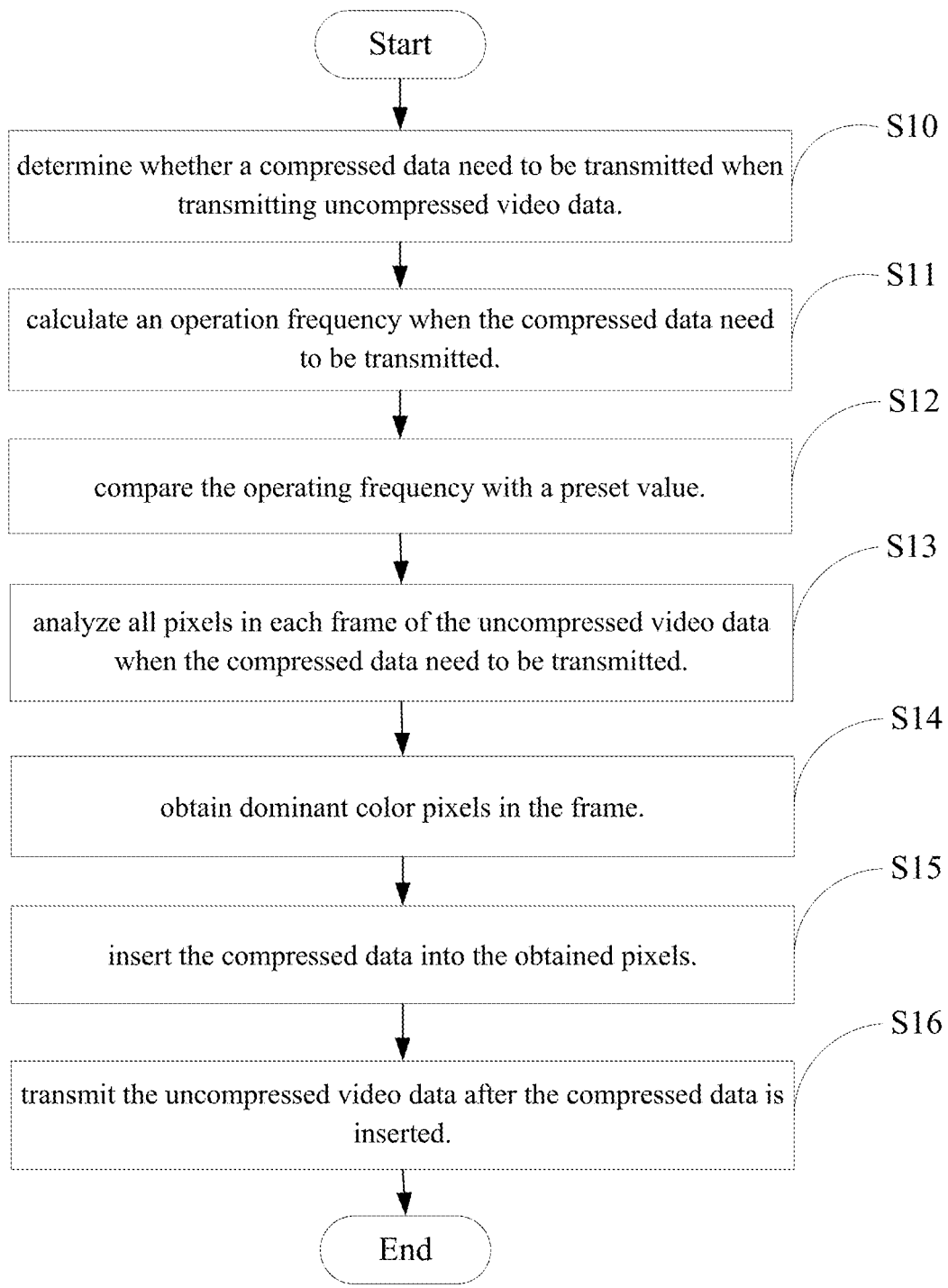
FIG. 2 is a flowchart of a video data transmission method.

FIG. 2 presents a flowchart of a method for transmitting video data. The transmission method is provided by way of example, as there are a variety of ways to carry out the transmission method. The transmission method described below can be carried out using the configurations illustrated in FIG. 1, for example, and various elements of these figures are referenced in explaining the transmission method. Each block shown in FIG. 2 represents one or more processes, methods, or subroutines, carried out in the exemplary transmission method. Additionally, the illustrated order of blocks is by example only and the order of the blocks can change. The transmission method can begin at block S10.

At block S10, the determining module 101 determines whether compressed data needs to be transmitted when transmitting uncompressed video data. In one embodiment, whenever the transmitting device 10 transmits uncompressed video data to the receiving device 20, the determining module 101 determines whether there is compressed data which needs to be transmitted to the receiving device 20 together with the uncompressed video data.

At block S11, the calculating module 102 calculates an operating frequency when the compressed data needs to be transmitted. In one embodiment, the operating frequency is a frequency of a user input operation received by the transmitting device 10 when the uncompressed video data is transmitted, such as a finger sliding operation and/or clicking frequency on a touch screen of the transmitting device 10.

At block S12, the comparing module 103 compares the operating frequency with a preset value. In one embodiment, the preset value is K. The comparing module 103 compares the operating frequency and the preset value K, to determine whether the operating frequency is less than K. The preset value K can be set according to an actual situation. If the operating frequency is not less than the preset value K, a current workload of the transmitting device 10 is deemed heavy and the transmission of the compressed data is not performed.

At block S13, the analyzing module 104 analyzes all pixels in each frame of the uncompressed video data when the operating frequency is determined as being less than the preset value K. In one embodiment, if the operating frequency is less than K, the analyzing module 104 analyzes colors of each pixel in each frame of the uncompressed video, to obtain a number of each color of the pixels.

At block S14, the obtaining module 105 obtains dominant color pixels in the frame. For example, if most of the pixels in the frame are white pixels, the obtaining module 105 obtains the white pixels. Further, the obtaining module 105 obtains the number of the obtained pixels in the frame and an error-tolerance rate of each pixel, to determine an amount of the compressed data that can be transmitted in the frame. For example, the obtaining module 105 obtains the number of the white pixels in the frame and their error-tolerance rate. If the number of the white pixels in the frame is N, the size of each white pixel is 10 bits, and the error-tolerance rate of each white pixel is 20%, then 10*20%*N=2N bits of the compressed data can be determined to be transmittable in the frame.

At block S15, the inserting module 106 inserts the compressed data into the obtained pixels. In one embodiment, the inserting module 106 inserts the compressed data into the obtained pixels of the frame by reference to the amount determined as transmittable. For example, the inserting module 106 inserts 2N bits of the compressed data into the white pixels of the frame, that is, the 2N bits data in the white pixels are replaced by the 2N bits of the compressed data. The corresponding amount of the compressed data can be inserted into each frame of the uncompressed video data in the manner described above.

At block S16, the transmitting module 107 transmits the uncompressed video data after the compressed data is inserted.

Figure 3:
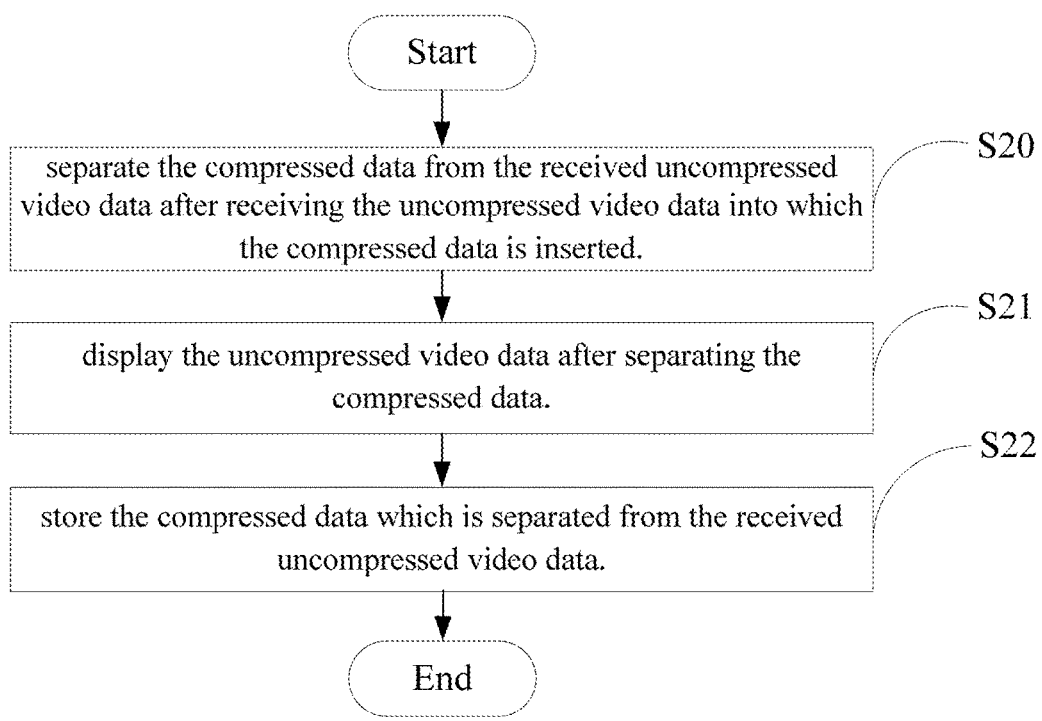
FIG. 3 is a flowchart of a receiving device receiving video data.

FIG. 3 presents a flowchart of a method for receiving the video data. The receiving method is provided by way of example, as there are a variety of ways to carry out the receiving method. The receiving method described below can be carried out using the configurations illustrated in FIG. 1, for example, and various elements of these figures are referenced in explaining the receiving method. Each block shown in FIG. 3 represents one or more processes, methods, or subroutines, carried out in the exemplary receiving method. Additionally, the illustrated order of blocks is by example only and the order of the blocks can change. The receiving method can begin at block S20.

At block S20, the separating module 201 separates the compressed data from the uncompressed video data after receiving the video data into which the compressed data is inserted.

At block S21, the display module 202 displays the uncompressed video data after separating out the compressed data.

At block S22, the data storage module 203 stores the compressed data which is separated from the received video data.

The embodiments shown and described above are only examples. Many details are often found in the art such as the other features of a video data transmission system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a video data transmission device, the method comprising:
   determining whether compressed data need to be transmitted when transmitting uncompressed video data;
   calculating an operation frequency when the compressed data need to be transmitted;
   comparing the operating frequency with a preset value;
   analyzing all pixels in each frame of the uncompressed video data when the operating frequency is less than the preset value;
   analyzing all pixels in each frame of the uncompressed video data when the compressed data need to be transmitted;
   obtaining dominant color pixels in the frame, the dominant color pixels are with a single color, wherein most of the pixels in the frame are with the single color;
   inserting the compressed data into the obtained pixels; and
   transmitting the uncompressed video data after the compressed data is inserted.

2. The method as claimed in claim 1, wherein the uncompressed video data and the compressed data are transmitted through a wire and wireless network.

3. The method as claimed in claim 1, wherein the operating frequency is a frequency of a user input operation received when the uncompressed video data is transmitted.

4. The method as claimed in claim 1, further comprising:
   obtaining the number of the obtained pixels and an error-tolerant rate of each pixel to determine an amount of the compressed data that can be transmitted in each frame.

5. A video data transmission device, the device comprising:
   at least one processor;
   a storage unit; and
   one or more programs that are stored in the storage unit and executed by the at least one processor, the one or more programs comprising instructions for:
   determining whether a compressed data need to be transmitted when transmitting uncompressed video data;
   calculating an operation frequency when the compressed data need to be transmitted;
   comparing the operating frequency with a preset value;
   analyzing all pixels in each frame of the uncompressed video data when the operating frequency is less than the preset value;
   analyzing all pixels in each frame of the uncompressed video data when the compressed data need to be transmitted;
   obtaining dominant color pixels in the frame, the dominant color pixels are with a single color, wherein most of the pixels in the frame are with the single color;
   inserting the compressed data into the obtained pixels; and
   transmitting the uncompressed video data after the compressed data is inserted.

6. The device as claimed in claim 5, wherein the uncompressed video data and the compressed data are transmitted through a wire and wireless network.

7. The device as claimed in claim 5, wherein the operating frequency is a frequency of a user input operation received when the uncompressed video data is transmitted.

8. The device as claimed in claim 5, further comprises instructions for:
obtaining the number of the obtained pixels and an error-tolerant rate of each pixel to determine an amount of the compressed data that can be transmitted in each frame.

9. A non-transitory storage medium, storing a set of instructions, the set of instructions being executed by a processor of a video data transmission device, to perform a method comprising:
determining whether a compressed data need to be transmitted when transmitting uncompressed video data;
calculating an operation frequency when the compressed data need to be transmitted;
comparing the operating frequency with a preset value;
analyzing all pixels in each frame of the uncompressed video data when the operating frequency is less than the preset value;
analyzing all pixels in each frame of the uncompressed video data when the compressed data need to be transmitted;
obtaining dominant color pixels in the frame, the dominant color pixels are with a single color, wherein most of the pixels in the frame are with the single color;
inserting the compressed data into the obtained pixels; and
transmitting the uncompressed video data after the compressed data is inserted.

10. The non-transitory storage medium as claimed in claim 9, wherein the uncompressed video data and the compressed data are transmitted through a wire and wireless network.

11. The non-transitory storage medium as claimed in claim 9, wherein the operating frequency is a frequency of a user input operation received when the uncompressed video data is transmitted.

12. The non-transitory storage medium as claimed in claim 9, wherein the method further comprises:
obtaining the number of the obtained pixels and an error-tolerant rate of each pixel to determine an amount of the compressed data that can be transmitted in each frame.

* * * * *